United States Patent
Shin et al.

(10) Patent No.: US 7,817,124 B2
(45) Date of Patent: Oct. 19, 2010

(54) LIQUID CRYSTAL DISPLAY PANEL, METHOD FOR DRIVING THE SAME, AND LIQUID CRYSTAL DISPLAY APPARATUS USING THE SAME

(75) Inventors: Kyoung Ju Shin, Yongin-si (KR); Hak Sun Chang, Yongin-si (KR); Yeon Ju Kim, Suwon-si (KR); Seung Hoo Yoo, Seongnam-si (KR); Hyun Wuk Kim, Yongin-si (KR); Hee Wook Do, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 787 days.

(21) Appl. No.: 11/524,022

(22) Filed: Sep. 19, 2006

(65) Prior Publication Data
US 2007/0070008 A1 Mar. 29, 2007

(30) Foreign Application Priority Data
Sep. 23, 2005 (KR) .................. 10-2005-0088460

(51) Int. Cl.
*G09G 3/36* (2006.01)
(52) U.S. Cl. .................... 345/87; 345/89; 345/100; 345/94
(58) Field of Classification Search ............ 345/77, 345/87–104, 173, 204, 208, 589, 590, 594, 345/690, 694, 698, 467, 469, 7, 695, 214; 438/30, 34; 257/350, E21.121, E21.632; 349/15, 37, 38, 39, 43, 48, 49, 61, 143, 147, 349/151, 114, 130, 152, 5; 348/771, 144; 315/169.3, 169.1; 313/506, 599; 382/261, 382/162, 199; 705/2; 359/292, 15; 358/425, 358/453; 428/1.1; 385/31, 147; 715/771, 715/169
See application file for complete search history.

(56) References Cited

U.S. PATENT DOCUMENTS

| | | | |
|---|---|---|---|
| 5,187,604 A * | 2/1993 | Taniguchi et al. | 349/152 |
| 5,543,819 A * | 8/1996 | Farwell et al. | 345/694 |
| 5,606,437 A | 2/1997 | Mosier | |
| 6,365,936 B1 * | 4/2002 | Shimabukuro et al. | 257/350 |
| 6,496,191 B2 * | 12/2002 | Asai et al. | 345/467 |
| 6,617,187 B1 * | 9/2003 | Shimabukuro et al. | 438/30 |
| 6,707,474 B1 * | 3/2004 | Beck et al. | 715/771 |
| 6,965,366 B2 * | 11/2005 | Ozawa | 345/89 |
| 7,193,625 B2 * | 3/2007 | Danner et al. | 345/214 |
| 7,206,005 B2 * | 4/2007 | Yamashita et al. | 345/695 |
| 7,248,271 B2 * | 7/2007 | Credelle et al. | 345/695 |
| 7,397,455 B2 * | 7/2008 | Elliott et al. | 345/88 |

(Continued)

*Primary Examiner*—Prabodh M Dharia
(74) *Attorney, Agent, or Firm*—Innovation Counsel LLP

(57) ABSTRACT

A liquid crystal display panel includes a plurality of sub-pixels, a plurality of thin film transistors, a plurality of data lines, and a plurality of gate lines. Each of the sub-pixels have first and second gray scale regions which are split up and down and have different areas, the first and second gray scale regions of one sub-pixel having a staggered arrangement with respect to those of an adjacent sub-pixel. Thin film transistors are connected to the first and second gray scale regions so that the first gray scale regions are driven when one of gate lines is driven and the second gray scale regions are driven when another gate line is driven.

6 Claims, 8 Drawing Sheets

U.S. PATENT DOCUMENTS

| | | | |
|---|---|---|---|
| 7,429,981 B2* | 9/2008 | Shimoshikiryoh | 345/204 |
| 7,450,202 B2* | 11/2008 | Tsuchiya | 349/114 |
| 7,525,526 B2* | 4/2009 | Brown Elliott et al. | 345/87 |
| 2002/0003636 A1* | 1/2002 | Conner | 359/15 |
| 2002/0024511 A1* | 2/2002 | Ozawa | 345/204 |
| 2002/0041328 A1* | 4/2002 | LeCompte et al. | 348/144 |
| 2003/0068093 A1* | 4/2003 | Baggs | 382/261 |
| 2003/0117414 A1* | 6/2003 | Sasaki | 345/589 |
| 2003/0169247 A1* | 9/2003 | Kawabe et al. | 345/204 |
| 2004/0251844 A1* | 12/2004 | Hashido et al. | 315/169.3 |
| 2005/0007543 A1* | 1/2005 | Kim et al. | 349/191 |
| 2005/0078256 A1* | 4/2005 | Hong | 349/141 |
| 2005/0088329 A1* | 4/2005 | Tsuchi | 341/144 |
| 2005/0088385 A1* | 4/2005 | Elliott et al. | 345/87 |
| 2005/0200784 A1* | 9/2005 | Kume et al. | 349/130 |
| 2005/0201679 A1* | 9/2005 | Ellwood, Jr. | 385/31 |
| 2005/0201715 A1* | 9/2005 | Ellwood, Jr. | 385/147 |
| 2006/0022928 A1* | 2/2006 | Kim et al. | 345/94 |
| 2006/0050210 A1* | 3/2006 | Tsuchiya | 349/114 |
| 2006/0098128 A1* | 5/2006 | Conner et al. | 349/5 |
| 2006/0158352 A1* | 7/2006 | Kim et al. | 341/1 |
| 2006/0221030 A1* | 10/2006 | Shih et al. | 345/88 |
| 2006/0268299 A1* | 11/2006 | Nose et al. | 358/1.9 |
| 2007/0013979 A1* | 1/2007 | Nose et al. | 358/519 |
| 2007/0026165 A1* | 2/2007 | Okabe et al. | 428/1.1 |
| 2007/0070008 A1* | 3/2007 | Shin et al. | 345/89 |
| 2007/0145893 A1* | 6/2007 | Jung et al. | 313/506 |
| 2008/0150673 A1* | 6/2008 | Okutani et al. | 338/315 |
| 2008/0252581 A1* | 10/2008 | Brown Elliott et al. | 345/88 |
| 2009/0046048 A1* | 2/2009 | Shimoshikiryoh | 345/99 |
| 2009/0102855 A1* | 4/2009 | Brown Elliott et al. | 345/589 |
| 2009/0141336 A1* | 6/2009 | Bohler | 359/292 |

* cited by examiner

LIQUID CRYSTAL DISPLAY PANEL, METHOD FOR DRIVING THE SAME, AND LIQUID CRYSTAL DISPLAY APPARATUS USING THE SAME

CROSS REFERENCE TO RELATED APPLICATION

This application claims priority from Korean Patent Application No. 2005-88460 filed Sep. 23, 2005, the contents of which are incorporated by reference herein in there entirety.

BACKGROUND OF THE INVENTION

1. Field of the Invention

The present invention relates to a liquid crystal display apparatus, and more particularly, to a liquid crystal display panel, a method for driving the same, and a liquid crystal display apparatus using the same which achieve a wide viewing angle by using a combination of gray scales of multiple domains and improved light transmittance and visibility.

2. Description of the Related Art

A liquid crystal display apparatus displays picture images by varying the light transmittance of a liquid crystal having dielectric anisotropy by use of an electric field. The liquid crystal display apparatus includes a liquid crystal display panel (hereinafter, referred to as "liquid crystal panel") for displaying picture images through a liquid crystal cell matrix, and a driving circuit for driving the liquid crystal panel. In the liquid crystal display apparatus, wide viewing angle technology has been developed in order to overcome restrictions on a viewing angle in which images seem to be distorted according to the viewer's position watching a screen.

As a typical wide viewing angle technology, a multi-domain vertical alignment (VA) mode is used. In the VA mode, liquid crystal molecules having negative dielectric anisotropy are vertically aligned and perpendicularly driven by an electric field, thereby varying light transmittance. The VA mode becomes a normally black mode because light does not penetrate a polarizer which is at right angles to the alignment direction of the liquid crystal molecules when a voltage is not supplied. Especially, in the multi-domain VA mode, each sub-pixel is split into multiple domains to symmetrically align the liquid crystal molecules. Accordingly, a wide viewing angle is achieved by symmetrically generating a variation in light transmittance. The multiple domains are formed by using a protrusion or slit.

The VA mode using a protrusion forms the protrusion on upper and lower substrates and a voltage is applied in the state that the liquid crystal molecules form a symmetrical pre-tilt based on the protrusion. Then the liquid crystal molecules are driven in the pre-tilt direction, thereby forming the multiple domains. However, since the VA mode using the protrusion is weak in constraints of the liquid crystal molecules caused by the protrusion, light leakage occurs around the protrusion and visibility is low.

In the VA mode using a slit pattern, that is, a patterned vertical alignment (PVA) mode forms a slit in a common electrode of the upper and lower substrates and a pixel electrode and symmetrically drives the liquid crystal molecules on the basis of the slit by using a fringe field generated by the slit, thereby forming the multiple domains. In the PVA mode, however, the liquid crystal alignment is scattered by a lateral field generated from an edge of a sub-pixel having a rectangular shape and a phenomenon such as an edge texture occurs. Therefore, lateral visibility is reduced and light transmittance is low.

SUMMARY OF THE INVENTION

It is therefore an object of the present invention to provide a liquid crystal display panel, a method for driving the same, and a liquid crystal display apparatus using the same which can improve visibility and transmittance in a multi-domain VA mode.

In accordance with a first aspect of the present invention, a liquid crystal display panel includes a plurality of sub-pixels each having first and second gray scale regions which are split up and down and have different areas, the first and second gray scale regions of one sub-pixel having a staggered arrangement with respect to those of an adjacent sub-pixel; a plurality of thin film transistors for independently driving the first and second gray scale regions; a plurality of data lines connected to the thin film transistors, for supplying first and second data signals to the first and second gray scale regions, respectively; and a plurality of gate lines for driving the plurality of thin film transistors by a horizontal period unit.

The first and second gray scale regions have a zigzag structure in which both sides of each of the first and second gray scale regions are bent on the basis of a horizontal axis to have a symmetrical tilt angle. One of the gate lines is overlapped with the bent part of the first and second gray scale regions, and another gate line is overlapped with a boundary between the sub-pixels which are adjacent to each other up and down. The liquid crystal display panel further includes a storage line overlapped with a boundary between the first and second gray scale regions which are adjacent to each other up and down. Each of the thin film transistors is connected to each pixel electrode of the first and second gray scale regions through a contact hole overlapped the storage line or a contact hole adjacent to the storage line.

A method for driving the liquid crystal display panel in accordance with a first aspect of the present invention includes the steps of: modulating an input data signal into the first and second data signals by using a look-up table; alternatively arranging the first and second data signals; converting the alternatively arranged first and second data signals into analog data signals by using a gamma voltage; simultaneously supplying the alternatively arranged first and second data signals to a plurality of data lines every horizontal period while a gate line is driven.

A liquid crystal display apparatus in accordance with a first aspect of the present invention includes the liquid crystal display panel; a gate driver for driving the gate lines of the liquid crystal panel; a data driver for driving the data lines of the liquid crystal panel; and a timing controller for controlling the gate driver and the data driver, modulating a data signal input from the exterior into the first and second data signals, and supplying the modulated first and second data signals to the data driver. The timing controller modulates the input data signal into the first and second data signals by using a look-up table in which the first and second data signals corresponding to the input data signal are previously stored, wherein an arranged order of the first and second data signals changes every horizontal period.

In accordance with a second aspect of the present invention, a liquid crystal display panel includes a plurality of sub-pixels each having first and second gray scale regions which are split up and down and have different areas, the first and second gray scale regions of one sub-pixel having a staggered arrangement with respect to those of an adjacent sub-pixel; a plurality of thin film transistors for independently driving the first and second gray scale regions; a plurality of data lines connected to the thin film transistors, for generating first and second data signals to be respectively supplied to the first and second gray scale regions; and a plurality of gate lines for driving the plurality of thin film transistors by a horizontal period unit; wherein the thin film transistors are connected to the first and second gray scale regions so that the first gray scale regions are driven when one of the plurality of gate lines is driven and the second gray scale regions are driven when another gate line is driven.

The first and second gray scale regions have a zigzag structure in which both sides of each of the first and second gray scale regions are bent on the basis of a horizontal axis to have a symmetrical tilt angle. The liquid crystal display panel further includes a storage line overlapped with a boundary between the first and second gray scale regions which are adjacent to each other up and down. A first gate line among the gate lines is overlapped with the bent part of the first and second gray scale regions, and a second gate line is overlapped with a boundary between the sub-pixels which are adjacent to each other up and down.

Thin film transistors connected to the first gate line are connected to the first gray scale regions located in upper and lower parts based on the storage line, and thin film transistors connected to the second gate line are connected to the second gray scale regions located in the upper and lower parts based on the storage line. Each of the thin film transistors have drain which is extended toward the storage line to be connected to corresponding gray scale region through a contact hole overlapped the storage line or a contact hole adjacent to the storage line. Contact holes for connecting the thin film transistors connected to the first gate line to the first gray scale region are alternatively located in the upper and lower parts of the storage line along a storage line direction. Contact holes for connecting the thin film transistors connected to the second gate line to the second gray scale region are alternatively located in the upper and lower parts of the storage line along a storage line direction.

A thin film transistor connected to the first gray scale region contained in one sub-pixel and a thin film transistor connected to the second gray scale region contained in the sub-pixel are connected to different adjacent data lines. The thin film transistors connected to the first gate line are connected to data lines adjacent to a first direction, and thin film transistors connected to the second gate line are connected to data lines adjacent to a second direction.

The liquid crystal display panel further includes a storage line overlapped with a bent part of each of the first and second gray scale regions. The gate lines are overlapped with a boundary between the first and second gray regions which are adjacent to each other up and down. The thin film transistors connected to a first gate line among the gate lines are connected to the first gray scale regions located in upper and lower parts of the first gate line, and thin film transistors connected to a second gate line are connected to second gray scale regions located in upper and lower parts of the second gate line. The first gray scale region is alternatively arranged in the upper and lower parts along the first gate line, and the second gray scale region is alternatively arranged in the upper and lower parts along the second gate line. A data signal applying direction of thin film transistors connected to the first and second gate lines is alternatively changed according to locations of the first and second gray scale regions. Positions of contact holes for connecting thin film transistors connected to the first gate line to the first gray scale region are alternatively changed according to a position of the first gray scale region, and positions of contact holes for connecting thin film transistors connected to the second gate line to the second gray scale region are alternatively changed according to a position of the second gray scale region. The contact holes are overlapped with the storage line. A thin film transistor connected to the first gray scale region contained in one sub-pixel and a thin film transistor connected to the second gray scale region contained in the sub-pixel are connected to different adjacent data lines.

In accordance with a third aspect of the present invention, a liquid crystal display panel includes each sub-pixel including a first gray scale region to which a first data signal is supplied according to a first gamma curve, a second gray scale region to which a second data signal is supplied according to a second gamma curve, and a third gray scale region connected to the second gray scale region; a first thin film transistor for driving the first gray scale region; a second thin film transistor for driving the second and third gray scale regions; a data line connected to the first and second thin film transistors, for supplying the first and second data signals; a first gate line for driving the first thin film transistor; and a second gate line for driving the second thin film transistor.

The first gray scale region connected to the first thin film transistor is arranged in an upper part of the first gate line, and the second and third gray scale regions connected to the second thin film transistor are arranged in a lower part of the first gate line or any one of the second and third gray scale regions is arranged in the upper part. The second and third gray scale regions are arranged in the lower part in one sub-pixel, and the second and third gray scale regions are respectively arranged in the upper and lower parts in sub-pixels adjacent to both sides of the one sub-pixel. The first, second and third gray scale regions have a zigzag structure in which both sides of each of the first, second and third gray scale regions are bent on the basis of a horizontal axis to have a symmetrical tilt angle. The liquid crystal display panel further includes a storage line overlapped with a boundary between the gray scale regions which are adjacent to each other up and down. Contact holes for connecting the thin film transistors to the gray scale regions are overlapped with the storage line.

A method for driving the liquid crystal display panel of the second and third aspects of the present invention includes the steps of generating a first gamma voltage set according to a first gamma curve; generating a second gamma voltage set according to a second gamma curve; selectively generating any one of the first and second gamma voltage sets by a horizontal period unit that the gate line is driven; and converting a data signal input from the exterior into a first data signal to be supplied to the first gray scale region or a second data signal to be supplied to the second gray scale region by using any one of the gamma voltage sets by the horizontal period unit, and supplying the converted data signal to the data line.

A liquid crystal display apparatus in accordance with a second aspect of the present invention includes: the liquid crystal display panel of the second and third aspects of the present invention; a gate driver for driving gate lines of the liquid crystal display panel; a first gamma voltage generator for generating a first gamma voltage set according to a first gamma curve; a second gamma voltage generator for generating a second gamma voltage according to a second gamma curve; a switch for selectively generating any one of the first and second gamma voltage sets by a horizontal period unit that the gate line is driven; a data driver for converting a data signal input from the exterior into a first data signal to be supplied to the first gray scale region or a second data signal to be supplied to the second gray scale region by using any one of the gamma voltage sets supplied through the switch by the horizontal period unit, and supplying the converted data signal to the data lines; and a timing controller for controlling the gate and data drivers. The switch is installed within the data driver.

BRIEF DESCRIPTION OF THE DRAWINGS

The above and other features and advantages of the present invention will become more apparent from the following detailed description when taken in conjunction with the accompanying drawings in which.

DETAILED DESCRIPTION OF THE PREFERRED EMBODIMENT

Figure 1:
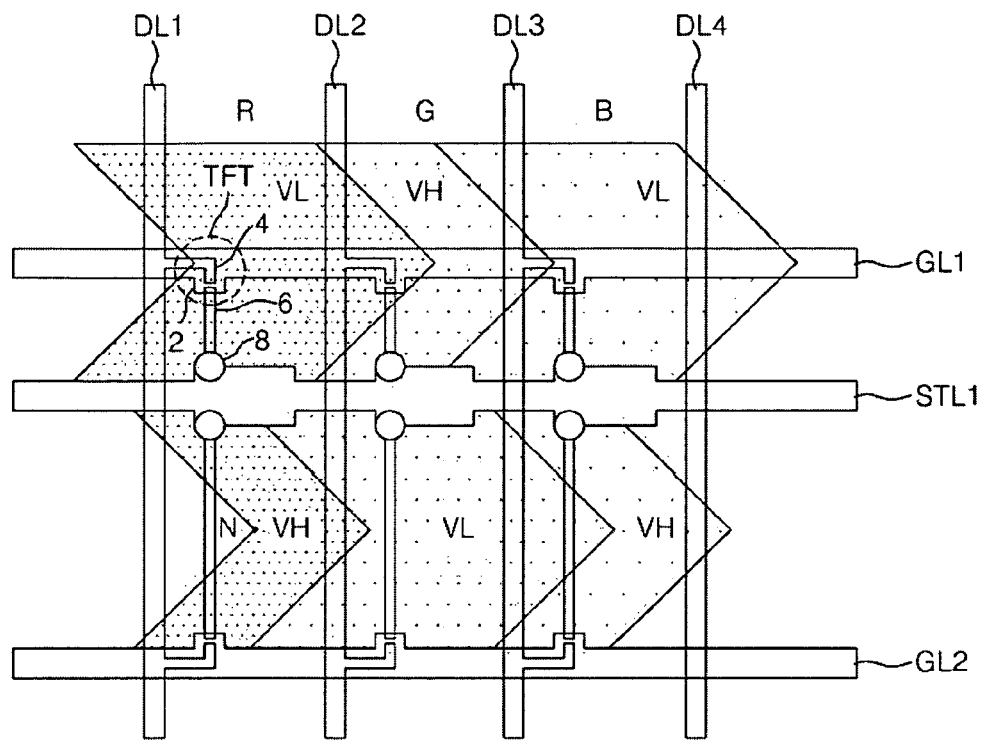
FIG. 1 is a plan view illustrating a structure of one pixel of a VA mode liquid crystal panel according to a first embodiment of the present invention.
Figure 2:
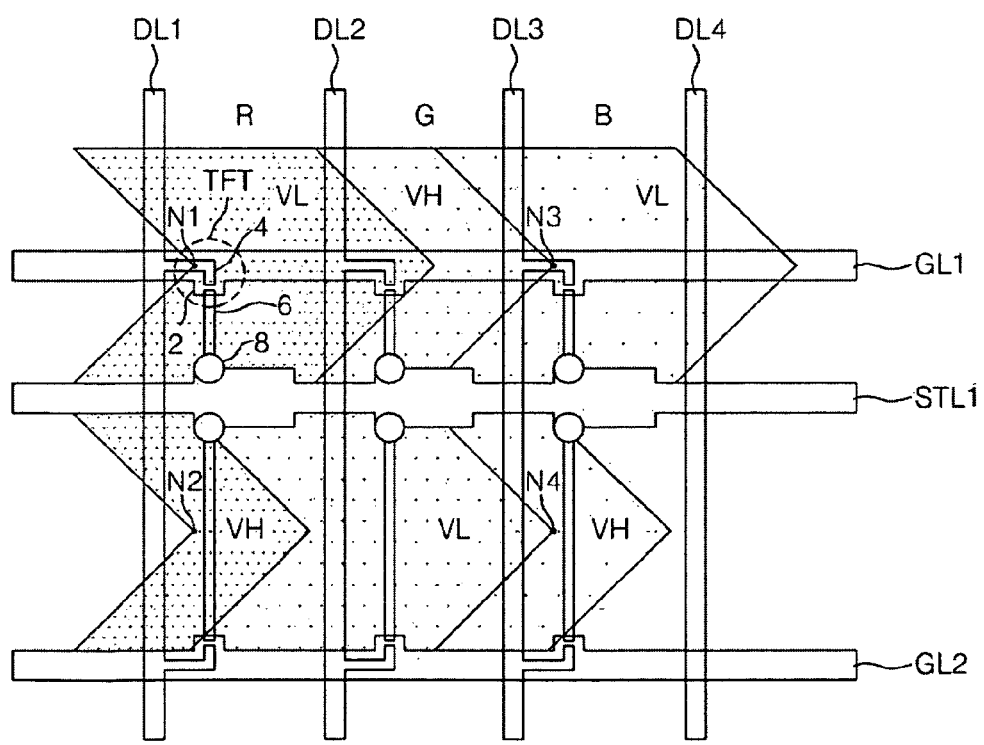
FIG. 2 is a plan view illustrating a structure of one pixel of a VA mode liquid crystal panel according to a second embodiment of the present invention.

FIGS. 1 and 2 are plan views illustrating a structure of one pixel of a VA mode liquid crystal panel according to first and second embodiments of the present invention, respectively.

Each pixel of the liquid crystal panel illustrated in FIGS. 1 and 2 includes R, G and B sub-pixels having a V-shaped configuration structure. Each of the R, G and B sub-pixels is split into a high gray scale region VH and a low gray scale region VL which are driven according to different gamma curves. These high and low gray scale regions VH and VL are independently driven by different thin film transistors (TFT). And the area of low gray scale region VL is one and a half times to three times that of the high gray scale region VH for improving visibility. It is desired that the low gray scale regions VL is two times that of the high gray scale regions VH.

Moreover, in order to improve transmittance, one sub-pixel region is split into three regions, that is, a high gray scale region VH of one split region and a low gray scale region VL of two split regions. The high and low gray scale regions VH and VL of one sub-pixel are arranged up and down and staggered with respect to those of an adjacent sub-pixel up and down. Accordingly, the high and low gray scale regions VH and VL of each sub-pixel are alternatively arranged along horizontal and vertical directions.

Moreover, the high and low gray scale regions VH and VL of each sub-pixel which are split up and down are formed to have right and left sides slanted in a zigzag pattern. As illustrated in FIGS. 1 and 2, for example, the right and left sides of each of the high and low gray scale regions VH and VL are formed to have a symmetrical slant of 45 degrees based on a contact point of the right and left sides of each gray scale region. Hence, the right and left sides of each of the high and low gray scale regions VH and VL of each sub-pixel are parallel to slits of a pixel electrode and a common electrode which have a staggered arrangement in order to split a domain into right and left sides in each of the high and low gray scale regions VH and VL. As a result, the electric field of the right and left sides of each sub-pixel helps to control a liquid crystal, thereby improving transmittance.

The high and low gray scale regions VH and VL of each sub-pixel of the zigzag or V-shaped structure have a center-aligned arrangement as shown in FIG. 1, or an edge-aligned arrangement as shown in FIG. 2. In the center-aligned arrangement shown in FIG. 1, a contact point N of the symmetric left sides of the high gray scale region VH is located in the center of two adjacent data lines DL. In the edge-aligned arrangement shown in FIG. 2, high and low gray scale regions VH and VL are arranged such that contact points N1 and N2 of the low and high gray scale region VL and VH of a sub-pixel located in the left side of two horizontally adjacent sub-pixels are located on the same vertical line, and contact points N3 and N4 of the high and low gray scale regions VH and VL of a sub-pixel located in the right side of two horizontally adjacent sub-pixels are located on the same vertical line. The sub-pixel of the zigzag structure is determined by a shape of a pixel electrode formed in the high and low gray scale regions VH and VL, and R, G and B color filters overlap with the pixel electrode. In other words, the pixel electrode and the R, G and B color filters formed in the high and low gray scale regions VH and VL of each sub-pixel have the above-described zigzag structure.

The pixel electrode is independently formed in each of the high and low gray scale regions VH and VL, and driven by different thin film transistors. The pixel electrode is formed on a lower substrate together with the thin film transistor and forms an electric field with a common electrode formed in an upper substrate, thereby driving vertically aligned liquid crystal molecules between the upper and lower substrates. In order to form multiple domains in each of the high and low gray scale regions VH and VL, the pixel electrode and the common electrode include slits of a staggered structure. For example, the high gray scale region VH is split into 4 up, down, right and left domains by the slits of the common electrode and pixel electrode having a staggered arrangement, and the low gray scale region VL is split into 8 domains. The thin film transistor TFT supplies a data signal of a data line DL to the pixel electrode in response to a scan signal of a gate line GL. The thin film transistor TFT includes a gate electrode 2 connected to the gate line GL, a source electrode 4 connected to the data line DL, a drain electrode 6 connected to the pixel electrode through a contact hole 8, and a semiconductor layer for forming a channel between the source and drain electrodes 4 and 6.

The high and low gray scale regions VH and VL which are divided up and down in each sub-pixel are independently driven through the thin film transistors TFT connected to different gate lines GL. As shown in FIGS. 1 and 2, for example, when a first gate line GL1 is driven by thin film transistors TFT connected between first to third data lines DL1, DL2 and DL3 and the first gate line GL1, the low gray scale region VL of an R sub-pixel, the high gray scale region VH of a G sub-pixel and the low gray scale region VL of a B sub-pixel are driven. When a second gate line GL2 is driven by thin film transistors TFT connected between the first to third data lines DL1, DL2 and DL3 and the second gate line GL2, the high gray scale region VH of the R sub-pixel, the low gray scale region VL of the G sub-pixel and the high gray scale region VH of the B sub-pixel are driven. That is, since the gray scale of the R, G and B sub-pixels is expressed by a combination of a high gray scale expressed in the high gray scale region VH and a low gray scale expressed in the low gray scale region VL, visibility is improved.

In order to improve transmittance, the first gate line GL1 is constructed such that it overlaps a bent part, that is, a center part of the high or low gray scale region VH or VL located in the upper side out of each sub-pixel, and the second gate line GL2 is formed to be overlapped with a boundary between sub-pixels which are adjacent to each other up and down. The first to fourth data lines DL1 to DL4 intersect the first and second gate lines GL1 and GL2 with an insulation layer interposed there between. The first storage line STL1 formed between the first and second gate lines GL1 and GL2 overlaps a boundary between the high and low gray scale regions VH and VL of each sub-pixel.

Each of the thin film transistors TFT connected to the first gate line GL1 is connected to the pixel electrode of the high or low gray scale region VH or VL located above the first storage line STL1. Each of the thin film transistors TFT connected to the second gate line GL2 is connected to the pixel electrode of the high or low gray scale region VH or VL located below the first storage line STL1. Each of the thin film transistors TFT connected to the first gate line GL1 has the drain electrode 6 which extends downward to the first storage line STL1, and is connected to the pixel electrode of the high or low gray scale region VH or VL through the contact hole 8 overlapped with the upper part of the storage line STL1 or the contact hole 8 adjacent to the storage line STL1. Each of the thin film transistors TFT connected to the second gate line GL2 has the drain electrode 6 which extends upward to the first storage line STL1, and is connected to the pixel electrode of the high or low gray scale region VH or VL through the contact hole 8 overlapped with the lower part of the storage line STL1 or the contact hole 8 adjacent to the storage line STL1. The drain electrode 6 connected the pixel electrode of the high or low gray scale region VH or VL through the contact hole 8 overlaps storage line STL1 to form a storage capacitor.

As described above, each sub-pixel of the liquid crystal panel according to the first and second embodiments of the present invention includes the high and low gray scale regions VH and VL of a zigzag structure which are split up and down and have an area ratio of 1:1.5~3, thereby improving transmittance and visibility.

Figure 3:
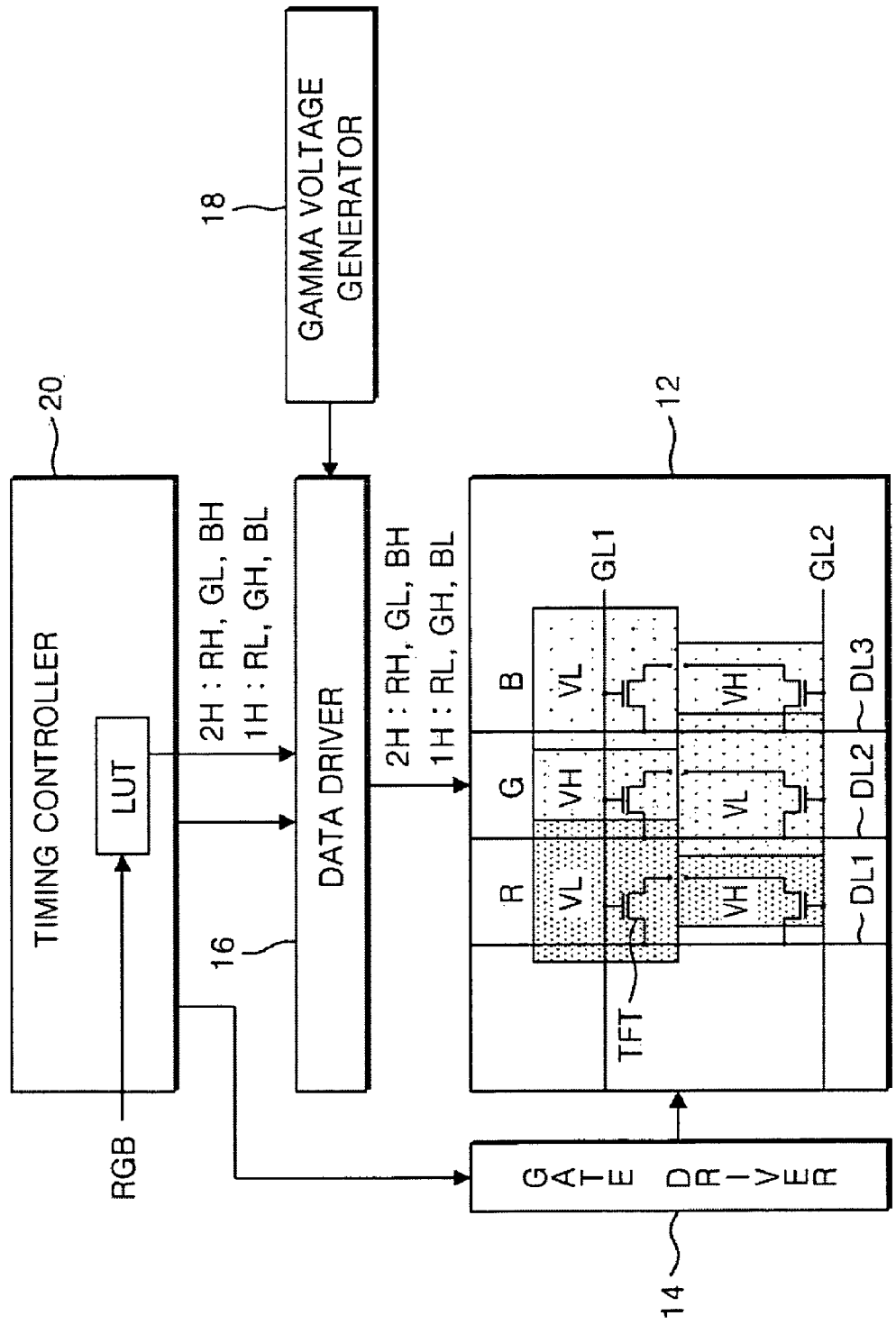
FIG. 3 is a block diagram of a liquid crystal display apparatus using the liquid crystal panels illustrated in FIGS. 1 and 2 according to a first embodiment of the present invention.

FIG. 3 illustrates a liquid crystal display apparatus suitable for use with the liquid crystal panels illustrated in FIGS. 1 and 2 according to a first embodiment of the present invention. Referring to FIG. 3, the liquid crystal display apparatus includes a liquid crystal panel 12, a gate driver 14 for driving gate lines GL of the liquid crystal panel 12, a data driver 16 for driving data lines DL of the liquid crystal panel 12, and a timing controller 20 for controlling the gate and data drivers 14 and 16.

The liquid crystal panel 12 includes R, G and B sub-pixels each consisting of high and low gray scale regions VH and VL which are split vertically and are formed in a zigzag, as illustrated in FIGS. 1 and 2. And the area of the low gray scale region VL is one and a half times to three times that of the high gray scale region VH. However, in FIG. 3, the R, G and B sub-pixels are simply illustrated. The high and low gray scale regions VH and VL of each sub-pixel are driven by different thin film transistors and have a staggered arrangement in the column direction with respect to those of an adjacent sub-pixel. For instance, an R low gray scale region VL, a G high gray scale region VH and a B low gray scale region VL are driven by thin film transistors connected to the first gate line GL1. An R high gray scale region VH, a G low gray scale region VL and a B high gray scale region VH are driven by thin film transistors connected to the second gate line GL2.

The timing controller 20 generates a gate control signal for controlling the gate driver 14 by using a synchronization signal input from the exterior and a clock signal and generates a data control signal for controlling the data driver 16. Moreover, the timing controller 20 receives R, G and B data signals from the exterior, and separates, that is, modulates the R, G and B data signals into RH, GH and BH data signals of a high gray scale and RL, GL and BL data signals of a low gray scale through a previously stored look-up table LUT. Also, the timing controller 20 stores the modulated data signals in a memory. Thereafter, the timing controller 20 supplies the data driver 16 with the high and low gray scale data signals stored in the memory according to an arrangement structure of the high and low gray scale regions VH and VL of each sub-pixel. For example, the timing controller 20 supplies the data driver 16 with the RL, GH, BL data signals during a first horizontal period and with the RH, GL and BH data signals during a second horizontal period. Accordingly, the timing controller 20 must operate at a high speed in order to split the R, G and B data signals into high and low gray scale data signals to be supplied to the data driver 16.

The gate driver 14 sequentially drives the gate lines GL of the liquid crystal panel 12 in response to the gate control signal received from the timing controller 20. The data driver 16 converts the data signals received from the timing controller 20 into analog data signals by using a gamma voltage received from a gamma voltage generator 18 and supplies the converted analog signals to the data lines DL whenever the gate line GL of the liquid crystal panel 12 is driven. More particularly, when the first gate line GL1 is driven, the data driver 16 converts the RL, GH and BL data signals received from the timing controller 20 into analog data signals, and supplies the converted analog data signals to the first to third data lines DL1, DL2 and DL3, respectively. Then the RL, GH and BL data signals are applied to the R low gray scale region VL, the G high gray scale region VH and the B low gray scale region VL, respectively, through thin film transistors connected between the first gate line GL1 and the first to third data lines DL1, DL2 and DL3. When the second gate line GL2 is driven, the data driver 16 converts the RH, GL and BH data signals received from the timing controller 20 into analog data signals, and supplies the converted analog data signals to the first to third data lines DL1, DL2 and DL3, respectively. Then the RH, GL and BH data signals are applied to the R high gray scale region VH, the G low gray scale region VL and the B high gray scale region VH, respectively, through thin film transistors connected between the second gate line GL2 and the first to third data lines DL1, DL2 and DL3. Therefore, each of the R, G and B sub-pixels expresses a gray scale by a combination of the high and low gray scales depending on the data signals applied to the high and low gray scale regions VH and VL.

As described previously, the liquid crystal display apparatus according to the first embodiment of the present invention splits the R, G and B data into high and low gray scale data by a data modulation method using a look-up table LUT of the timing controller 20, that is, by a digital method, and supplies the split high and low gray scale data to the high and low gray scale regions VH and VL, respectively, of a sub-pixel which are divided up and down in the liquid crystal panel 12.

Figure 4:
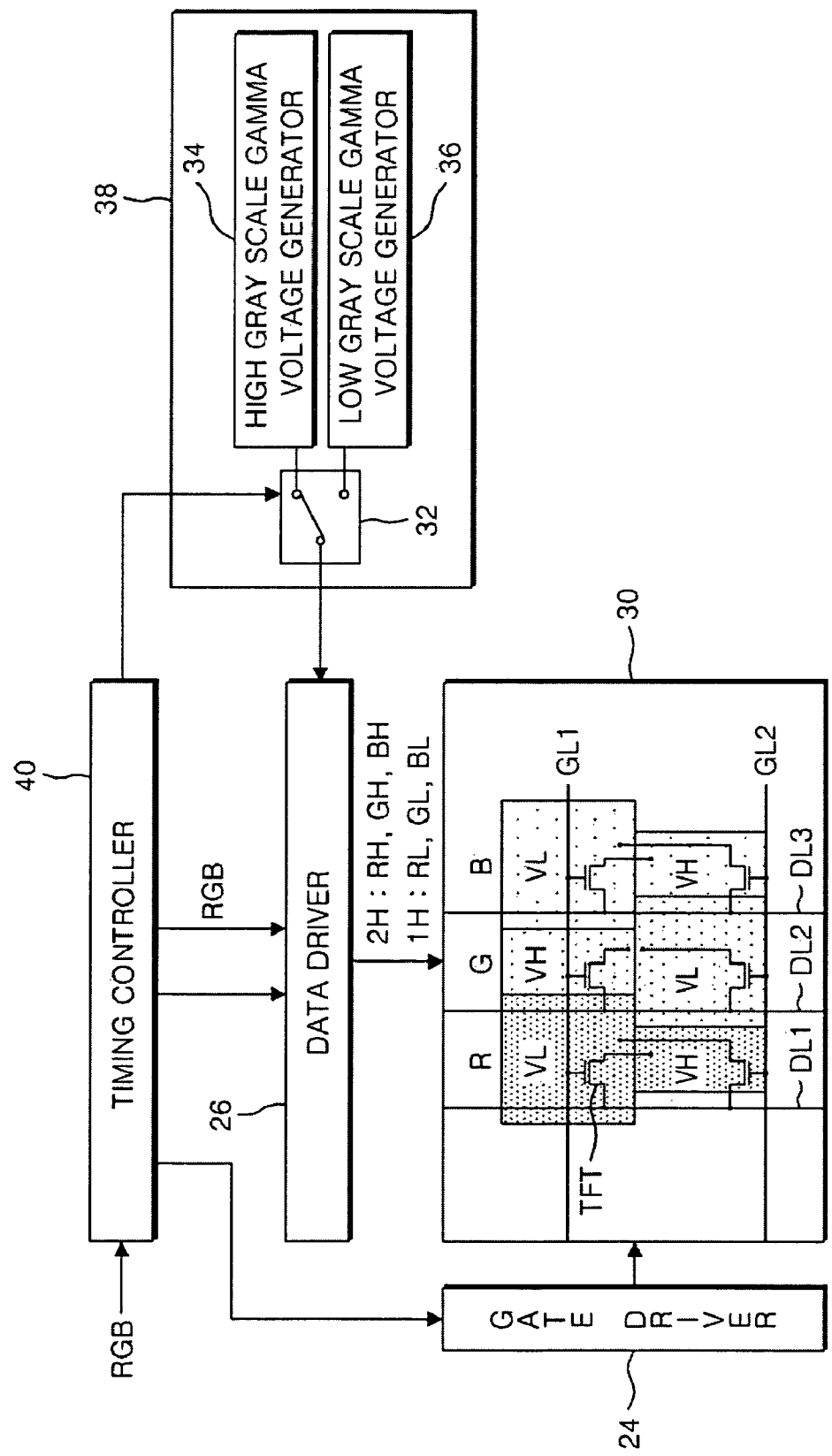
FIG. 4 is a block diagram of a liquid crystal display apparatus according to a second embodiment of the present invention.

FIG. 4 illustrates a liquid crystal display apparatus according to a second embodiment of the present invention. The liquid crystal display apparatus of FIG. 4 independently drives the high and low gray scale regions VH and VL of a sub-pixel which are divided up and down by an analog method that splits the R, G and B data into the high and low gray scale data by using high and low gray scale gamma voltages.

The liquid crystal display apparatus of FIG. 4 includes a liquid crystal panel 30, a gate driver 24 for driving gate lines GL of the liquid crystal panel 30, a data driver 26 for driving data lines DL of the liquid crystal panel 30, a timing controller 40 for controlling the gate and data drivers 24 and 26, and a gamma voltage generator 38 for selectively supplying high and low gray scale gamma voltages to the data driver 26.

The timing controller 40 generates a gate control signal for controlling the gate driver 24 by using a synchronization signal input from the exterior and a clock signal, and generates a data control signal for controlling the data driver 26. Additionally, the timing controller 40 rearranges R, G and B data signals input from the exterior and supplies the rearranged data signals to the data driver 26.

Figure 5:
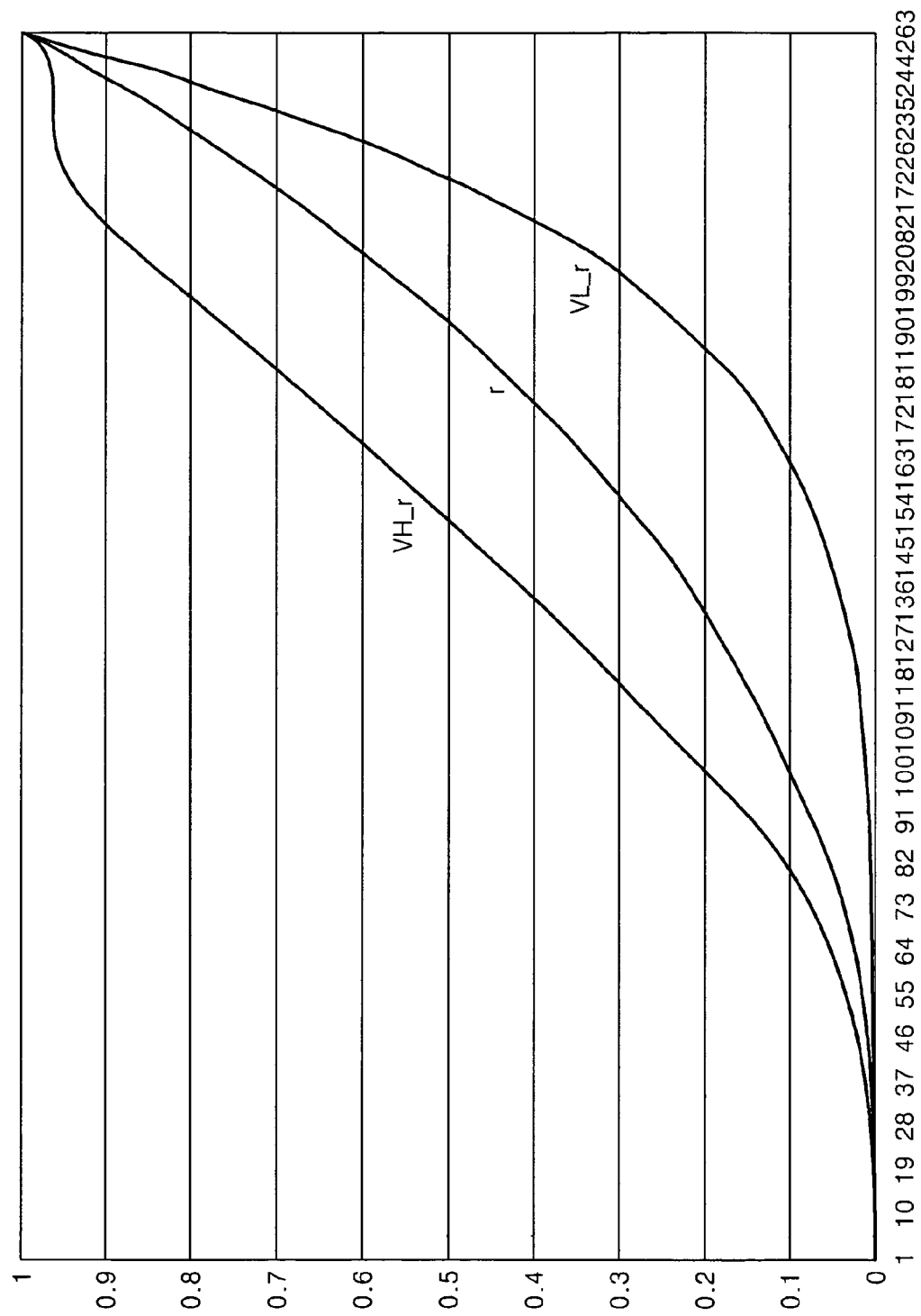
FIG. 5 is a graph illustrating a gamma curve applied to a gamma voltage generator shown in FIG. 4.

The gate driver 24 sequentially drives the gate lines GL of the liquid crystal panel 30 in response to the gate control signal received from the timing controller 40. The data driver 26 converts data signals received from the timing controller 40 into analog data signals. The data driver 26 provides high and low gray scale data signals by using high and low gray scale gamma voltages received from the gamma voltage generator 38, and supplies the received signals to the liquid crystal panel 30. The gamma voltage generator 38 includes a high gray scale gamma voltage generator 34 for generating a plurality of high gray scale gamma voltages, a low gray scale gamma voltage generator 36 for generating a plurality of low gray scale gamma voltages, and an analog switch 32 for switching the outputs of the high and low gray scale gamma voltage generators 34 and 36. The high gray scale gamma voltage generator 34 generates a plurality of high gray scale gamma voltages by a resistor string which a plurality resistors designed according to a high gray scale gamma curve VH_r shown in FIG. 5 are connected directly. The low gray scale gamma voltage generator 36 generates a plurality of low gray scale gamma voltages by a resistor string which a plurality resistors designed according to a low gray scale gamma curve VL_r shown in FIG. 5 are connected directly. The analog switch 32 supplies the data driver 26 with the high gray scale gamma voltages received from the high gray scale gamma voltage generator 34 during one horizontal synchronization period and with the low gray scale gamma voltages received from the low gray scale gamma voltage generator 36 during the next horizontal synchronization period. The switching operation is repeated every horizontal synchronization period. The analog switch 32 is driven in synchronization with a period during which a data signal of the data driver 26 is transmitted to the liquid crystal panel 30 by the control of the timing controller 40. The analog switch 32 may be alternatively included within the data driver 26. During one horizontal period, the data driver 26 converts the R, G and B data signals received from the timing controller 40 into high gray scale data signals by using the high gray scale gamma voltages and supplies the high gray scale data signals to the liquid crystal panel 30. During the next horizontal period, the data driver 26 converts the R, G and B data signals received from the timing controller 40 into low gray scale data signals by using the low gray scale gamma voltages and supplies the low gray scale data signals to the liquid crystal panel 30.

Although the liquid crystal panel 30 includes R, G and B sub-pixels of a zigzag structure consisting of high and low gray scale regions VH and VL which are split vertically and have a 1:1.5~3 area ratio, the R, G and B sub-pixels are simply illustrated in FIG. 4. It is desired that the low gray scale regions VL is two times that of the high gray scale regions VH. The high and low gray scale regions VH and VL of each sub-pixels are driven by respective thin film transistors and have a staggered arrangement in vertical direction with respect to those of an adjacent sub-pixel. Especially, by the analog method using the gamma voltage generator 38, the high and low gray scale regions VH and VL of the R, G and B sub-pixels are separately driven by a horizontal period during which the high gray scale data signals are supplied and a horizontal period during which the low gray scale data signals are supplied. For example, thin film transistors TFT connected to the first gate line GL1 are connected to the high gray scale regions VH of the R, G and B sub-pixels, and thin film transistors connected to the second gate line GL2 are connected to the low gray scale regions VL of the R, G and B sub-pixels.

More particularly, the thin film transistors TFT which are connected to the first gate line GL1 and are located in the upper R and B low gray scale regions VL have respective drains which extend downwardly and are connected to the lower R and B high gray scale regions VH. Similarly, the thin film transistors TFT which are connected to the second gate line GL2 and are located in the R and B high gray scale regions VH have their respective drains which extend upwardly and are connected to the upper R and B low gray scale regions VL. The thin film transistor TFT which is connected to the first gate line GL1 and is located in the upper G high gray scale region VH is connected to the upper G high gray scale region VH, and the thin film transistor TFT which is connected to the second gate line GL2 and is located in the lower G low gray scale region VL is connected to the lower G low gray scale region VL. During the first horizontal period while the first gate line GL1 is driven, the RH, GH and BH data signals of the high gray scale are applied to the R, G and B high gray scale regions VH, respectively, through thin film transistors between the first gate line GL1 and the first to third data lines DL1, DL2 and DL3. During the second horizontal period while the second gate line GL2 is driven, the RL, GL and BL data signals of the low gray scale are applied to the R. G and B low gray scale regions VL, respectively, through thin film transistors between the second gate line GL2 and the first to third data lines DL1, DL2 and DL3. Therefore, each of the R, G and B sub-pixels expresses a gray scale along a gamma curve r shown in FIG. 5 by a combination of the high and low gray scales depending on the data signals applied to the high and low gray scale regions VH and VL, respectively.

As described above, the liquid crystal display apparatus according to the second embodiment of the present invention splits the R, G and B data into high and low gray scale data by the analog method using the high and low gray scale gamma voltages, and supplies the split high and low gray scale data to the high and low gray scale regions VH and VL, respectively, which are divided vertically in the sub-pixels. Since the analog method does not need a high speed operation of the timing controller compared to the digital method using the look-up table, deterioration in picture quality caused by a noise of the high speed operation can be prevented. Furthermore, the analog method can express a minute gray scale by adjusting respective gamma strings of the high and low gray scales, whereas using the digital method makes it difficult to express a minute gray scale because the high and low gray scales are expressed by one gamma string.

Below, VA mode liquid crystal panels to which the analog method shown in FIG. 4 is applicable are described in detail.

Figure 6:
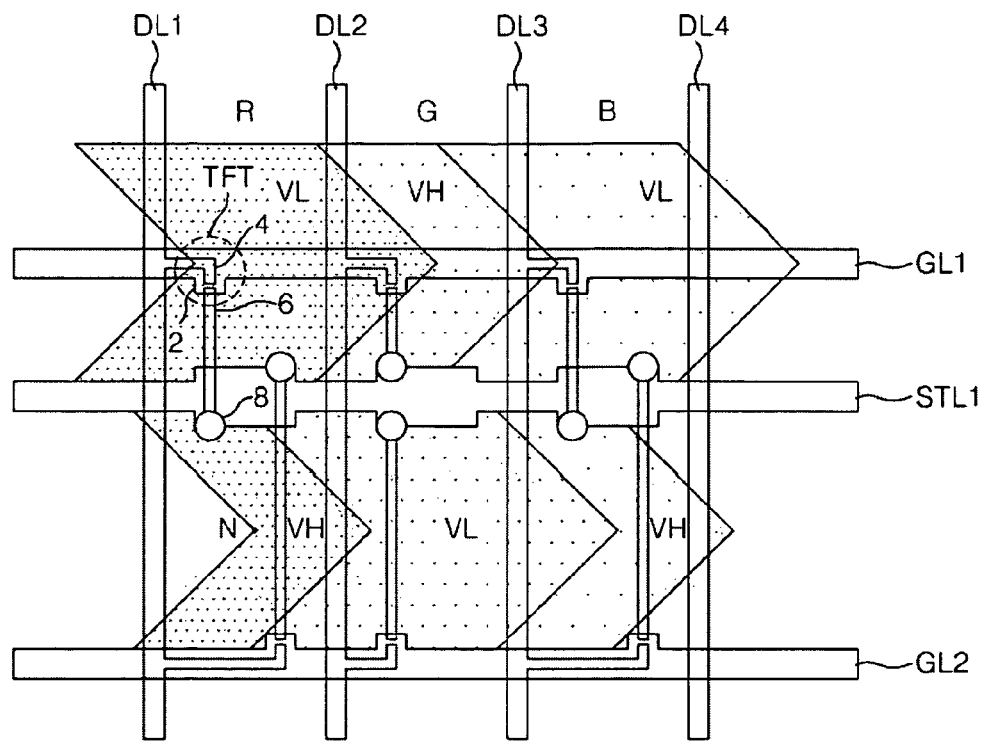
FIG. 6 is a plan view illustrating a structure of one pixel of a VA mode liquid crystal panel according to a third embodiment of the present invention.
Figure 7:
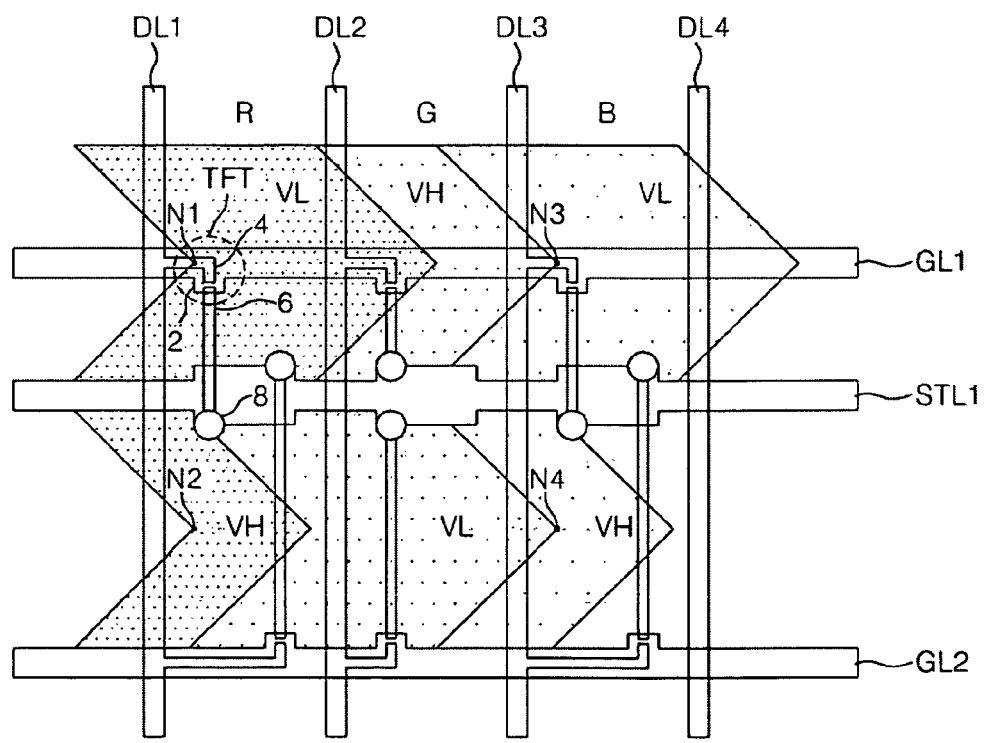
FIG. 7 is a plan view illustrating a structure of one pixel of a VA mode liquid crystal panel according to a fourth embodiment of the present invention.

FIGS. 6 and 7 are plan views illustrating a structure of one pixel of a VA mode liquid crystal panel according to third and fourth embodiments of the present invention, respectively. The liquid crystal panels of FIGS. 6 and 7 illustrate R, G and B sub-pixels of the liquid crystal panel 30 shown in FIG. 4 by a zigzag structure. When compared with the liquid crystal panels shown in FIGS. 1 and 2, the liquid crystal panels shown in FIGS. 6 and 7 have the same constituent elements except that contact holes 8 of thin film transistors are arranged to be staggered with respect to those of an adjacent sub-pixel in the up and down directions like the high and low gray scale regions VH and VL having a staggered arrangement. Therefore, a detailed description of the repeated elements will be omitted.

The R, G and B sub-pixels shown in FIGS. 6 and 7 are split up and down into the high and low gray scale regions VH and VL having an area ratio of 1:1.5~3. It is desired that the low gray scale regions VL is two times that of the high gray scale regions VH. The split high and low gray scale regions VH and VL have a center-aligned arrangement as shown in FIG. 6 or an edge-aligned arrangement as shown in FIG. 7. Moreover, the high and low gray scale regions VH and VL of each sub-pixel have a staggered arrangement with respect to those of an adjacent sub-pixel. In order to supply the high and low gray scale data signals which are split by the analog method shown in FIG. 4 to the high and low gray scale regions VH and VL of each sub-pixel, the high gray scale regions VH of the R, G and B sub-pixels are simultaneously driven during one horizontal period and the low gray scale regions VL of the R, G and B sub-pixels are simultaneously driven during the next horizontal period. That is, thin film transistors TFT connected to a first gate line GL1 drive the high gray scale regions VH of the R, G and B sub-pixels, respectively, and thin film transistors connected to a second gate line GL2 drive the low gray scale regions VL of the R, G and B sub-pixel, respectively.

In more detail, the thin film transistors TFT connected to the first gate line GL1 overlap with a bent part of the upper low or high gray scale region VL or VH together with the first gate line GL1. Among these thin film transistors, the thin film transistors for driving the R and B high gray scale regions VH have respective drain electrodes 6 which extend downward and are connected to the lower R and B high gray scale regions VH, respectively, through contact holes 8 located in a lower part of a first storage line STL1. The thin film transistor for driving the G high gray scale region VH has a drain electrode 6 which extends downward and is connected to the upper G high gray scale region VH through a contact hole 8 located in an upper part of the first storage line STL1. In other words, the contact holes 8 for connecting the thin film transistors TFT connected to the first gate line GL1 to the low or high gray scale region VL or VH are alternatively located in the upper and lower parts of the first storage line STL1. Thin film transistors TFT connected to a second gate line GL2 are overlapped with a boundary between upper and lower parts of each sub-pixel together with the second gate line GL2. Among these thin film transistors TFT, the thin film transistors TFT for driving the R and B low gray scale regions VL have respective drain electrodes 6 which are extended upward and connected to the upper R and B low gray scale regions VL, respectively, through contact holes 8 located in the upper part of the first storage line STL1. The thin film transistor TFT for driving the G low gray scale region VL has a drain electrode 6 which is extended upward and connected to the lower G low gray scale region VL through a contact hole 8 located in the lower part of the first storage line STL1. In other words, the contact holes 8 for connecting the thin film transistors TFT connected to the second gate line GL2 to the high or low gray scale regions are alternatively located in the upper and lower parts of the first storage line STL1.

Therefore, during a horizontal period while the first gate line GL1 is driven, the high gray scale data signals using the high gray scale gamma voltages are charged to the R, G and B high gray scale regions VH. During a horizontal period while the second gate line GL2 is driven, the low gray scale data signals using the low gray scale gamma voltages are charged to the R, G and B low gray scale regions VL. As a result, the R, G and B sub-pixels express a corresponding gray scale by a combination of the high and low gray scales achieved in the high and low gray scale regions VH and VL.

Figure 8:
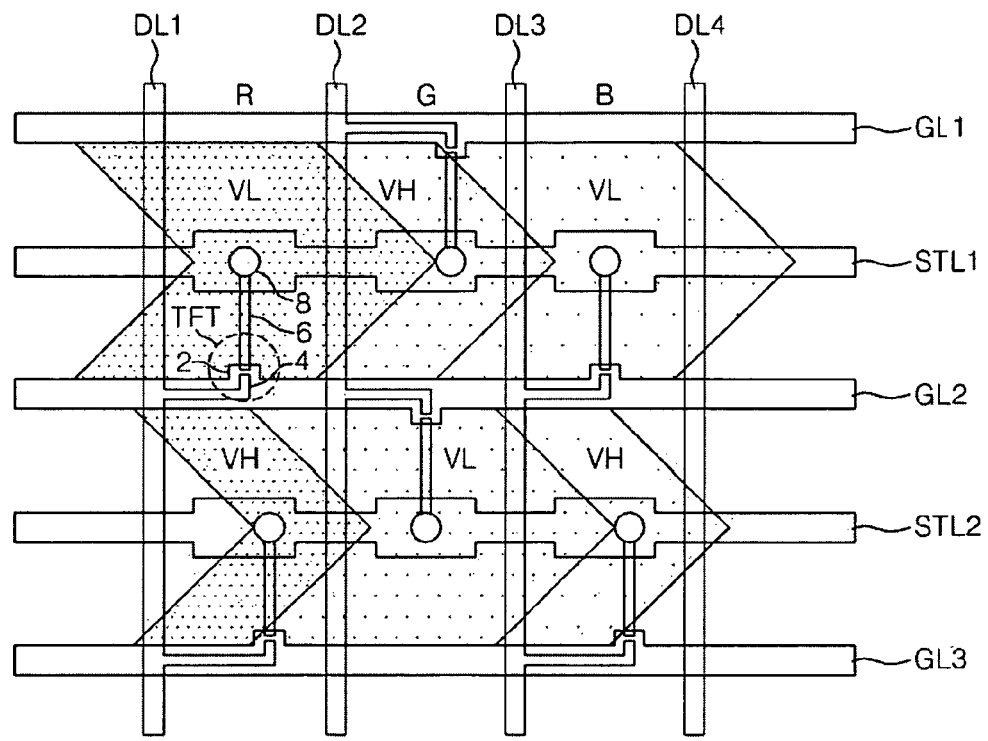
FIG. 8 is a plan view illustrating a structure of one pixel of a VA mode liquid crystal panel according to a fifth embodiment of the present invention.

FIG. 8 is a plan view illustrating a structure of one pixel of a VA mode liquid crystal panel according to a fifth embodiment of the present invention. The liquid crystal panel shown in FIG. 8 has the same constituent elements as FIG. 6 except that thin film transistors for driving high and low gray scale regions of one sub-pixel are connected to different data lines. Therefore, a detailed description of the repeated elements will be omitted.

Referring to FIG. 8, two. Thin film transistors TFT for driving high and low gray scale regions VH and VL which are split up and down in one sub-pixel are connected to different gate lines and to different data lines. This is because if the two thin film transistors TFT for respectively driving the high and low gray scale regions VH and VL of one sub-pixel are connected to the same data line, an overlapped length of a source electrode 4 of any one of the two thin film transistors TFT and the data line increases and thus a parasite capacitance increases. To prevent this, the two thin film transistors TFT for respectively driving the high and low gray scale regions VH and VL of one sub-pixel are connected to different data lines, thereby reducing an overlapped length of the source electrode 4 and the gate line. For example, thin film transistors TFT connected to a first gate line GL1 are connected to data lines of their left side, and thin film transistors TFT connected to a second gate line GL2 are connected to data lines of their right side.

In more detail, the thin film transistors TFT connected to the first gate line GL1 to drive the R, G and B high gray scale regions VH are respectively connected to the first to third data lines DL1 to DL3 of their left side. That is, the thin film transistors TFT connected to the first gate line GL1 have respective source electrodes 4 connected to the left data lines DL1 to DL3 and have respective drain electrodes 6 which are extended downward and connected to the R, G and B high gray scale regions VH. The thin film transistors TFT connected to the second gate line GL2 to drive the R, G and B low gray scale regions VL are respectively connected to the second to fourth data lines DL2 to DL4 of their right side. That is, the thin film transistors TFT connected to the second gate line GL2 have respective source electrodes 4 connected to the right data lines DL2 to DL4 and have respective drain electrodes 6 which are extended upward and connected to the R, G and B low gray scale regions VL.

Therefore, the thin film transistor TFT connected to the second gate line GL2 and to the right data lines can more reduce the overlapped length of the source electrode 4 and the gate line than the thin film transistor TFT connected to the left data line as shown in FIG. 6. Consequently, a parasite capacitance caused by the overlap of the gate line GL2 and the source electrode 4 decreases and thus a signal distortion caused by the parasite capacitance can be prevented.

Figure 9:
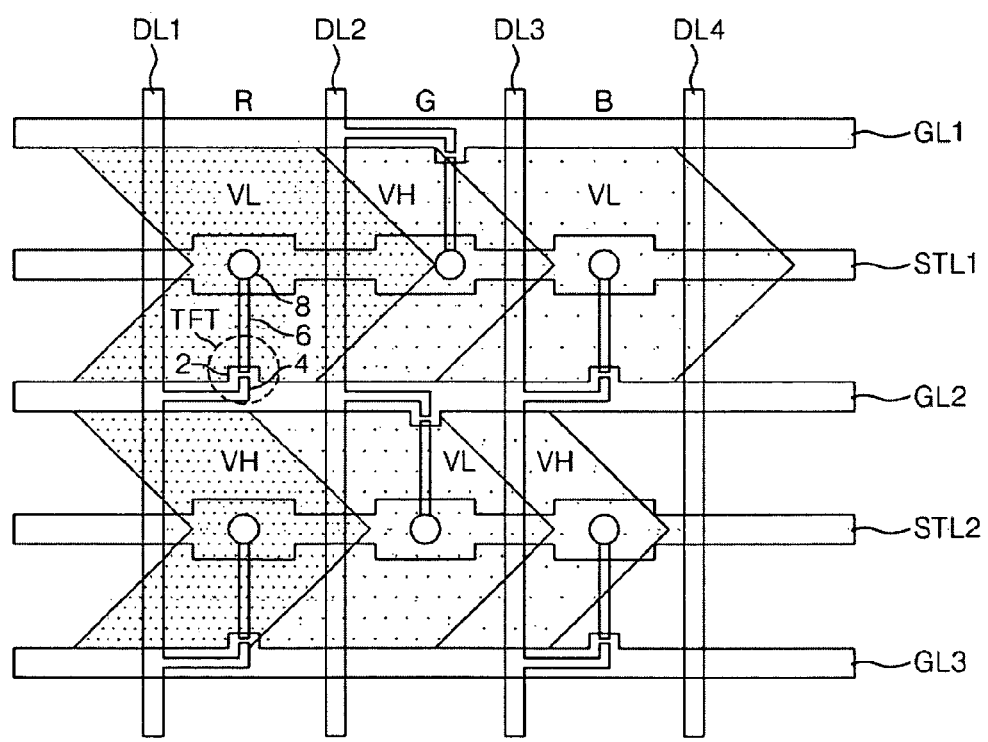
FIG. 9 is a plan view illustrating a structure of one pixel of a VA mode liquid crystal panel according to a sixth embodiment of the present invention.
Figure 10:
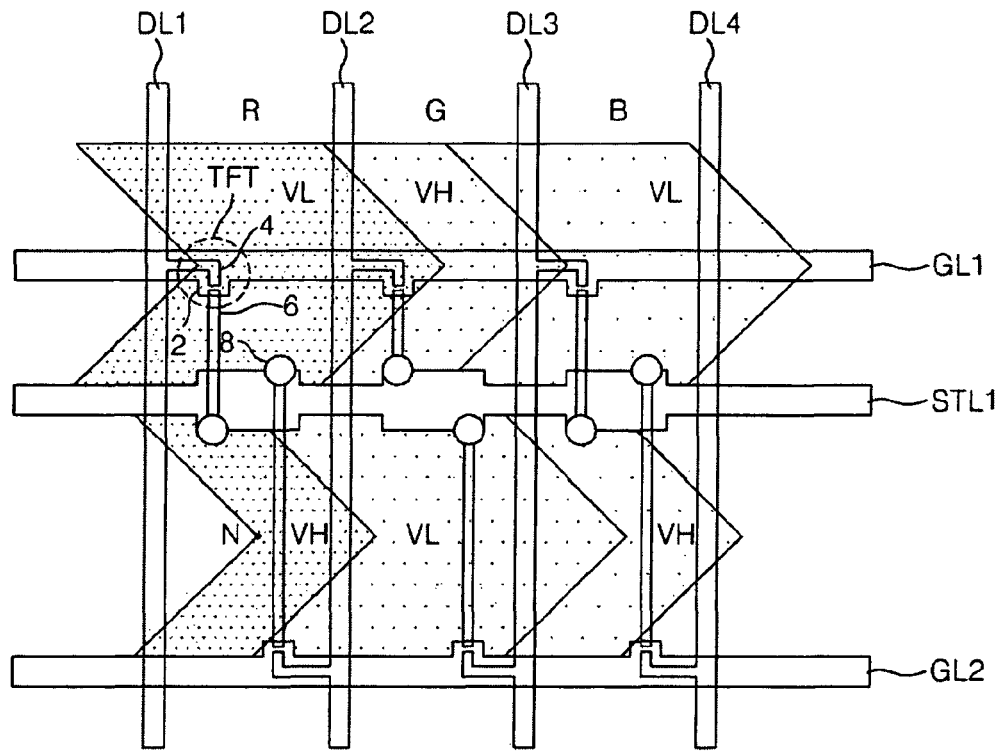
FIG. 10 is a plan view illustrating a structure of one pixel of a VA mode liquid crystal panel according to a seventh embodiment of the present invention.

FIGS. 9 and 10 are plan views illustrating a structure of one pixel of a VA mode liquid crystal panel according to sixth and seventh embodiments of the present invention, respectively. The liquid crystal panels shown in FIGS. 9 and 10 have the same constituent elements as those shown in FIGS. 6 and 7 except that a gate line and a storage line are added and a data signal applying direction of a thin film transistor in one sub-pixel is opposite to a thin film transistor in an adjacent sub-pixel. Therefore, a detailed description of the repeated elements will not be given.

Each of R, G and B sub-pixels shown in FIGS. 9 and 10 is arranged such that the high and low gray scale regions VH and VL which are split up and down have a staggered arrangement with respect to those of a horizontally adjacent sub-pixel in the up and down directions. These R, G and B sub-pixels have a center-aligned arrangement as shown in FIG. 10 or an edge-aligned arrangement as shown in FIG. 9. Two thin film transistors TFT for respectively driving the high and low gray scale regions VH and VL of each sub-pixel have a data signal apply direction opposite to those of a horizontally adjacent sub-pixel. For instance, two thin film transistors TFT for driving the low and high gray scale regions VL and VH of the R sub-pixel are connected to the low and high gray scale regions VL and VH through contact holes 8 located in the upper parts of those thin film transistors TFT, respectively. However, two thin film transistors TFT for driving the high and low gray scale regions VH and VL of the G sub-pixel are connected to the high and low gray scale regions VH, and VL through contact holes 8 located in the lower parts of those thin film transistors TFT.

In more detail, first to third gate lines GL1, GL2 and GL3 are formed such that the first gate line GL1 overlaps a boundary between upwardly adjacent sub-pixels, the second gate line GL2 with a boundary between the high and low gray scale regions VH and VL of each sub-pixel, and the third gate line GL3 with a boundary between downwardly adjacent sub-pixels. First and second storage lines STL1 and STL2 are formed such that the first storage line STL1 overlaps bent parts of the high and low gray scale regions VH and VL which are located in an upper part of the second gate line GL2 and the second storage line STL2 overlaps bent parts of the high and low gray scale regions VH and VL which are located in a lower part of the second gate line GL2.

Thin film transistors TFT for driving the high and low gray scale regions VH and VL of the R and B sub-pixels are driven by the second and third gate lines GL2 and GL3 located in a lower part of those regions VH and VL. In other words, the thin film transistors TFT which are connected to the second gate line GL2 and respectively drive the R and B low gray scale regions VL have respective drain electrodes 6 which are extended upward and connected respectively to the R and B low gray scale regions VL through contact holes 8 overlapped with the first storage line STL1. The thin film transistors which are connected to the third gate line GL3 and respectively drive the R and B high gray scale regions VH have respective drain electrodes 6 which are extended upward and connected respectively to the R and B high gray scale regions VH through contact holes 8 overlapped with the second storage line STL2.

The thin film transistors TFT for driving the high and low gray scale regions VH and VL of the G sub-pixel are driven by the first and second gate lines GL1 and GL1 located in an upper part of those regions VH and VL. In other words, the thin film transistor TFT which is connected to the first gate line GL1 and drives the G high gray scale region VH has a drain electrode 6 which is extended downward and connected to the G high gray scale region VH through a contact hole 8 overlapped with the first storage line STL1. The thin film transistor TFT which is connected to the second gate line GL2 and drives the G low gray scale region VL has a drain electrode 6 which is extended downward and connected to the G low gray scale region VL through a contact hole 8 overlapped with the second storage line STL2.

During a horizontal period while the first gate line GL1 is driven, high gray scale data is applied to the G high gray scale region VH, and during a horizontal period while the second gate line GL2 is driven, low gray scale data is applied to the R, G and B low gray scale regions VL. During a horizontal period while the third gate line GL3 is driven, high gray scale data is charged to the R and B high gray scale regions VH. In this case, during the horizontal period while the third gate line GL3 is driven, high gray scale data is applied to the R high gray scale region VH of a next sub-pixel. Then data corresponding to two horizontal lines should be supplied during one horizontal period, and this is possible because the timing controller supplies data corresponding to the two horizontal lines by combination. In this case, the timing controller uses a frame memory contained necessarily therein or additionally includes a line memory to combine data of two horizontal lines. As a result, the R, G and B sub-pixels express a corresponding gray scale by a combination of the high and low gray scales achieved in the high and low gray scale regions VH and VL.

Thus the liquid crystal panels shown in FIGS. 8 and 9 form the gate lines every upper and lower boundary of the high and low gray scale regions VH and VL, and alternatively change the data signal applying direction of the thin film transistor TFT along the gate line. Accordingly, the length of the drain electrode 6 of the thin film transistor TFT is more reduced than the length of the drain electrode 6 of the thin film transistor TFT shown in FIGS. 6 and 7 and thus an aperture ratio increases.

The liquid crystal panels shown in FIGS. 6 and 7 have a disadvantage of generating coupling deviation due to a parasite capacitor because the drain electrode 6 of the thin film transistor TFT passes through a gray scale region to which another data signal is supplied. However, in the liquid crystal panels shown in FIGS. 8 and 9, the coupling deviation can be prevented because the drain electrode of the thin film transistor is not overlapped with a gray scale region to which another data signal is supplied. Referring again to FIGS. 6 and 7, for instance, the drain electrode 6 of the thin film transistor TFT for driving the R high gray scale region VH passes through the R low gray scale region, and the drain electrode 6 of the thin film transistor TFT for driving the R low gray scale region VL passes through the R high gray scale region. Meanwhile, the drain electrodes 6 of the thin film transistors TFT for driving the G high and low gray scale regions pass through only the corresponding gray scale regions. In this case, in the R and G high and low gray scale regions, the polarity of data signals is changed in up, down, right and left directions according to a dot inversion driving. Then since a parasite capacitance between the R high and low gray scale regions more increases than a parasite capacitance between the G high and low gray scale regions, there occurs the coupling deviation and stains of vertical lines may occur. In order to solve such shortcomings, the liquid crystal panels shown in FIGS. 9 and 10 change the data signal applying direction of the thin film transistor and overlap the drain electrode 6 only with a corresponding gray scale region instead of another gray scale region. Therefore, the coupling deviation caused by a difference in the parasite capacitance can be prevented.

Figure 11:
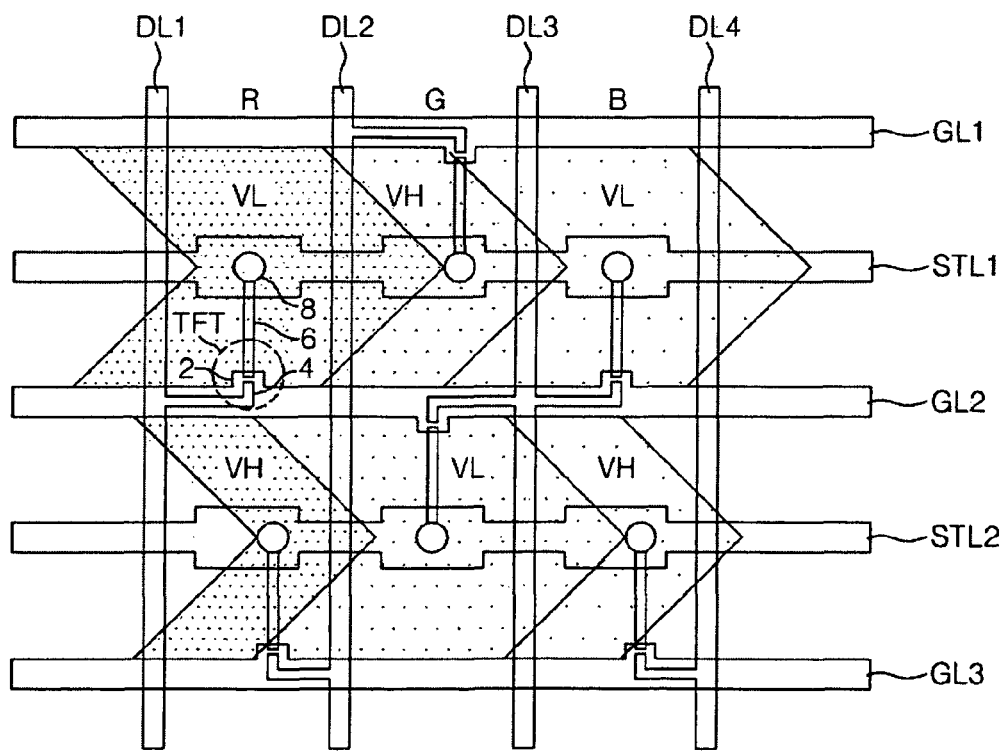
FIG. 11 is a plan view illustrating a structure of one pixel of a VA mode liquid crystal panel according to an eighth embodiment of the present invention.

FIG. 11 is a plan view illustrating a structure of one pixel of a VA mode liquid crystal panel according to an eighth embodiment of the present invention. The liquid crystal panel shown in FIG. 11 has the same constituent elements as that shown in FIG. 9 except that thin film transistors TFT for driving high and low gray scale regions VH and VL of one sub-pixel are connected to different data lines DL. Therefore, a detailed description of the repeated elements will be omitted.

Two thin film transistors TFT for driving the high and low gray scale regions which are split up and down in one sub-pixel are connected to different gate lines GL and to different data lines DL. This is because if the two thin film transistors for respectively driving the high and low gray scale regions VH and VL of one sub-pixel are connected to the same data line, an overlapped length of a source electrode 4 of any one of the two thin film transistors TFT and a data line DL increases and thus a parasite capacitance increases. To prevent this, two thin film transistors TFT for respectively driving the high and low gray scale regions VH and VL of one sub-pixel are connected to different data lines of their both sides, thereby reducing an overlapped length of the source electrode 4 and the gate line GL and thus reducing the parasite capacitance.

Figure 12:
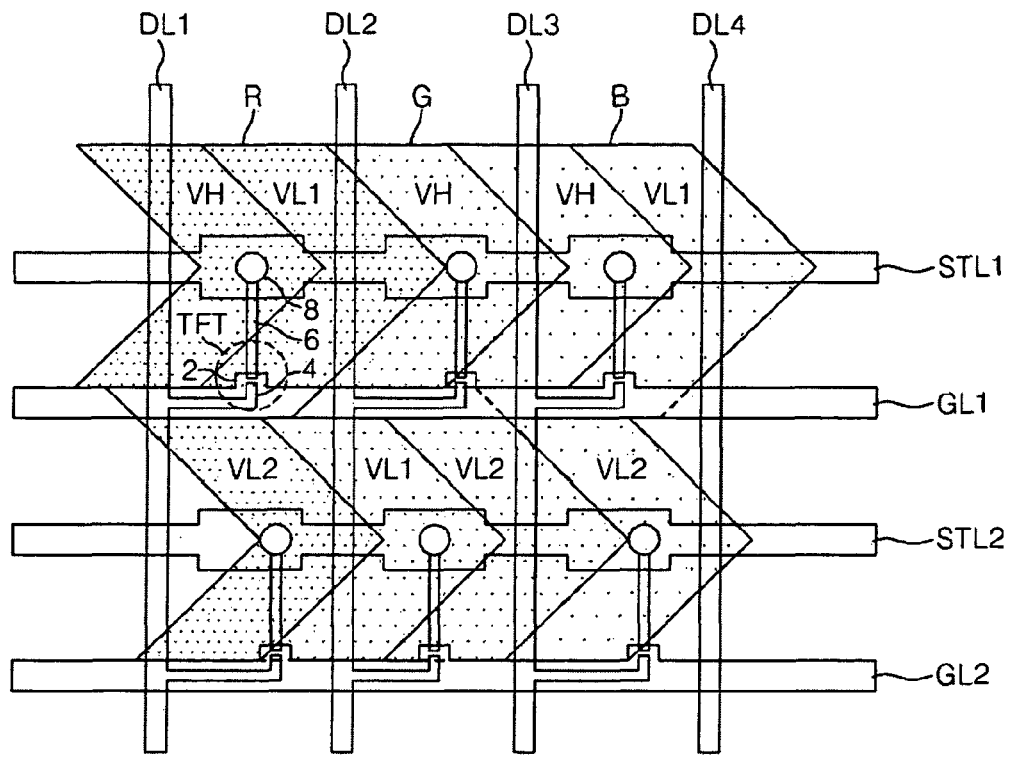
FIG. 12 is a plan view illustrating a structure of one pixel of a VA mode liquid crystal panel according to a ninth embodiment of the present invention.
Figure 13:
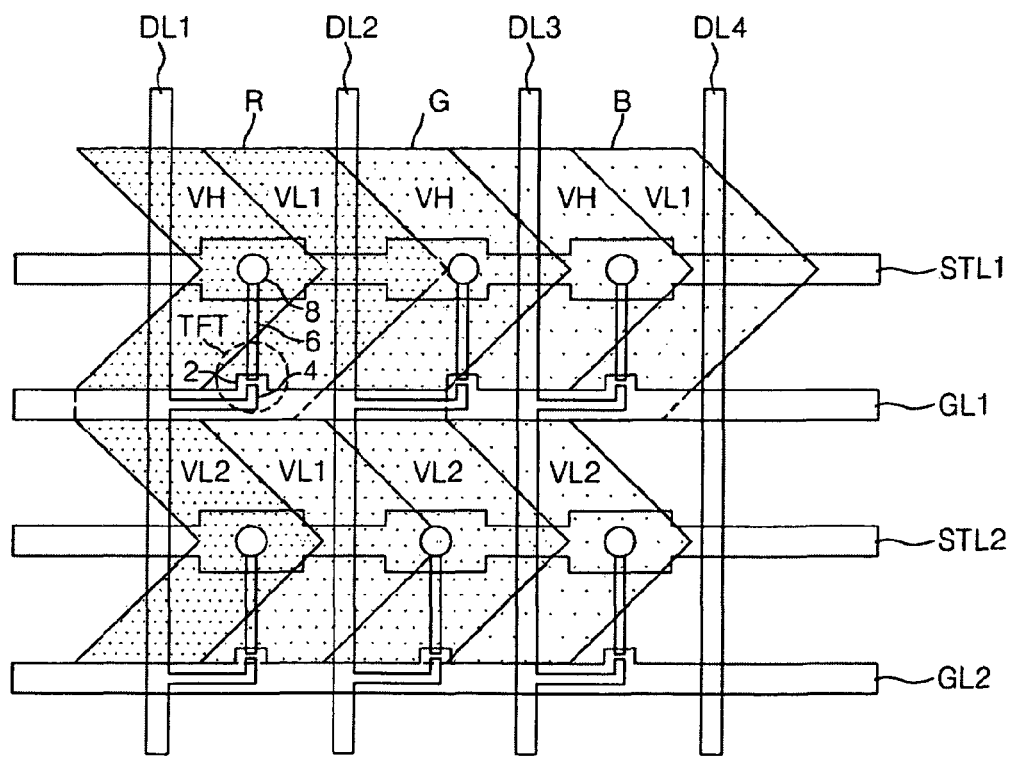
FIG. 13 is a plan view illustrating a structure of one pixel of a VA mode liquid crystal panel according to a tenth embodiment of the present invention.

FIGS. 12 and 13 are plan views illustrating a structure of one pixel of a VA mode liquid crystal panel according to sixth and seventh embodiments of the present invention, respectively. Each of R, G and B sub-pixels shown in FIGS. 12 and 13 is split into the high and low gray scale regions VH and VL having an area ratio of 1:1.5~3. It is desired that the low gray scale regions VL is two times that of the high gray scale regions VH. The low gray scale region VL is again split into first and second low gray scale regions VL1 and VL2 having the same area. These R, G and B sub-pixels have a center-aligned arrangement as shown in FIG. 12 or an edge-aligned arrangement as shown in FIG. 13.

In the R, G and B sub-pixels, one sub-pixel is formed such that their high and low gray scale regions VH and VL are split up and down. The other two sub-pixels adjacent to the both sides of one sub-pixel are formed such that the high gray scale region VH and the first low gray scale region VL1 are split in an upper part and the second low gray scale region VL2 connected to the first low gray scale region VL1 of the upper part is formed in a lower part. In other words, the high gray scale region VH of each sub-pixel is located in the upper part, and the first and second low gray scale regions VL1 and VL2 are all located in the lower part or in the upper and lower parts.

For example, the G sub-pixel is formed such that its high and low gray scale regions are split up and down, whereas the R and B sub-pixels adjacent to the G sub-pixel are formed such that the high gray scale region and the first low gray scale region VL1 are split in an upper part and the second low gray scale region VL2 connected to the first low gray scale region VL1 of the upper part is formed in the lower part. That is, the high gray scale regions VH of the R, G and B sub-pixels are located in the upper part, the first and second low gray scale regions VL1 and VL2 of the G sub-pixel are located in the lower part, and the first and second low gray scale regions VL1 and VL2 of the R and B sub-pixels are located in the upper and lower parts, respectively. These high gray scale regions VH of the R, G and B sub-pixels are driven by thin film transistors TFT connected to a first gate line GL1, and the low gray scale regions VL1 and VL2 thereof are driven by thin film transistors connected to a second gate line GL2. In more detail, the first and second gate lines GL1 and GL2 are formed such that the first gate line GL1 is overlapped with a boundary between the gray scale regions which are split up and down in each sub-pixel, and the second gate line GL2 is overlapped with a boundary between downwardly adjacent sub-pixels. A first storage line STL1 is overlapped with bent parts of the gray scale regions located in the upper part of the first gate line GL1, and a second storage line STL2 is overlapped with bent parts of the gray scale regions located in the lower part.

The R, G and B high gray scale regions VH are driven by the thin film transistors TFT formed between the first gate line GL1 and first to third data lines DL1, DL2 and DL3. These thin film transistors TFT are connected to the high gray scale regions VH through contact holes 8 overlapped with the first storage line STL1. The R, G and B low gray scale regions VL are driven by the thin film transistors TFT formed between the second gate line GL2 and the first to third data lines DL1, DL2 and DL3. These thin film transistors TFT are connected to any one of the low gray scale regions VL1 and VL2 through contact holes 8 overlapped with the second storage line STL2. During a horizontal period while the first gate line GL1 is driven, high gray scale data is charged to the R, G and B high gray scale regions VH. During a horizontal period while the second gate line GL2 is driven, low gray scale data is charged to the R, G and B low gray scale regions. As a result, the R, G and B sub-pixels express a corresponding gray scale by a combination of the high and low gray scales achieved in the high and low gray scale regions.

In the liquid crystal panels shown in FIGS. 12 and 13, the high gray scale regions VH of the respective sub-pixels are formed on the same horizontal line, and at least any one of the first and second low gray scale regions VL1 and VL2 is formed on another horizontal line. Hence, the high and low gray scale data can be separately driven by the analog method illustrated in FIG. 4. In this case, since the protruding directions of the thin film transistors TFT are the same, an aperture ratio is more improved than the case that the protruding directions are changed up and down.

As described above, the liquid crystal display apparatus according to the present invention includes R, G and B sub-pixels of a zigzag structure each having the high and low gray scale regions which are divided up and down and have an area ratio of 1:1.5~3 and a staggered arrangement with respect to an adjacent sub-pixel, thereby improving visibility and transmittance. Furthermore, the liquid crystal display apparatus according to the present invention can be driven by using the digital method or applying the analog method that separates the R, G and B sub-pixels of a zigzag structure into the high and low gray scale data.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A liquid crystal display panel comprising:
    a plurality of sub-pixels each having first and second gray scale regions which have different areas, the first and second gray scale regions of one sub-pixel having a staggered arrangement with respect to those of an adjacent sub-pixel;
    a first thin film transistor to drive the first gray scale region;
    a second thin film transistor to drive the second gray scale region;

a data line connected to the first and second thin film transistors, to supply first and second data signals to the first and second gray scale regions, respectively;

a first gate line to drive the first thin film transistor by a first horizontal period unit;

a second gate line to drive the second thin film transistor by a second horizontal period unit; and a storage line disposed between the first and second gate lines and extended in parallel with the first and second gate lines, wherein the first and second gray scale regions of each sub-pixel are arranged along a first direction parallel with the data line, the second gray scale region of a second sub-pixel of three sub-pixels successively arranged along a second direction parallel with the first gate line is positioned between the first gray scale region of a first sub-pixel of the three sub-pixels and the first gray scale region of a third sub-pixel of the three sub-pixels, and the first gray scale region of the second sub-pixel is positioned between the second gray scale region of the first sub-pixel and the second gray scale region of the third sub-pixel.

2. The liquid crystal display panel of claim 1, wherein the first and second gray scale regions are V-shaped and an apex of each of the V-shaped regions points in a common direction along an axis and further wherein sides have the same angle with respect to the axis.

3. The liquid crystal display panel of claim 2, wherein the first gate line overlaps apices of the first and second gray scale regions, and the second gate line overlaps a boundary between vertically adjacent sub-pixels.

4. The liquid crystal display panel of claim 3, wherein the storage line overlaps a boundary between vertically adjacent first and second gray scale regions, the first and second thin film transistors are respectively connected to sub-pixel electrodes of the first and second gray scale regions through a contact hole which overlaps the storage line or a contact hole adjacent to the storage line.

5. The liquid crystal display panel of claim 1, wherein the area of one of the first and second gray scale regions is one and half times to three times the area of rest gray scale regions.

6. The liquid crystal display panel of claim 1, wherein the first and second gray scale regions have a zigzag structure in a first direction parallel with the data line, and each of the first and second gray scale regions is bent in a second direction parallel with the first gate line.

* * * * *